Aug. 22, 1967 A. LENDER 3,337,864
DUOBINARY CONVERSION, RECONVERSION AND ERROR DETECTION
Filed Aug. 1, 1963 4 Sheets-Sheet 1
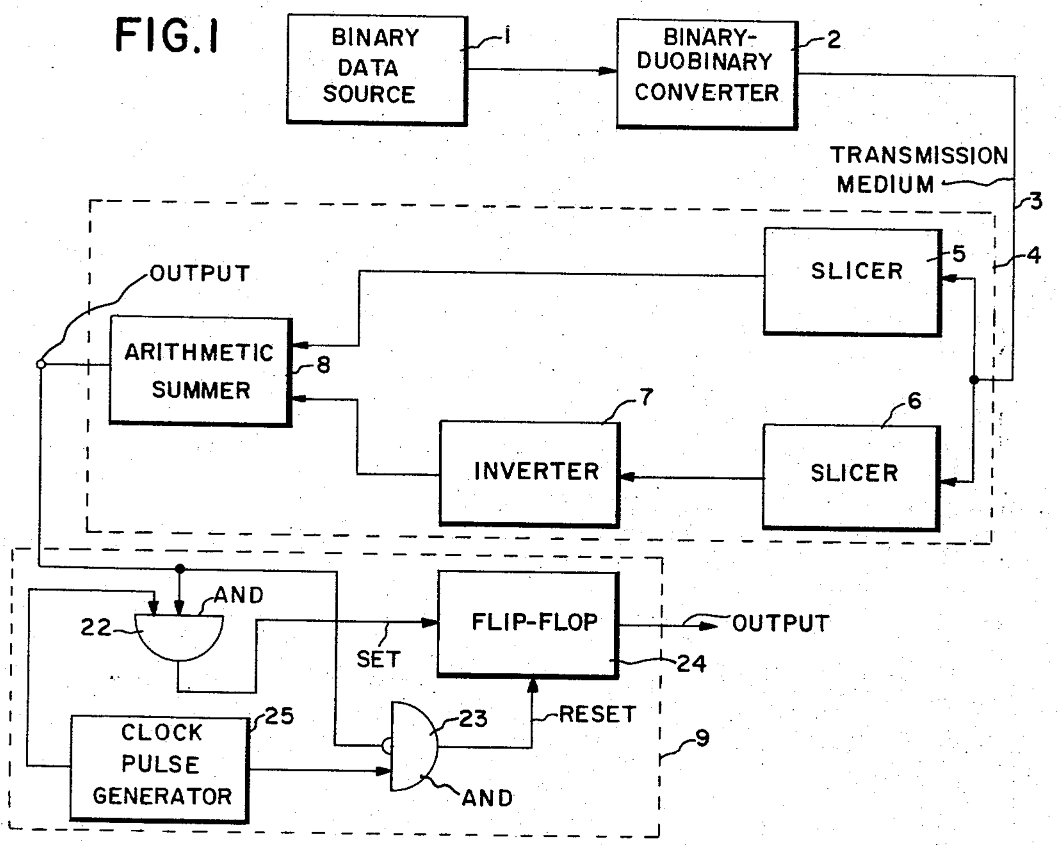
FIG. 3
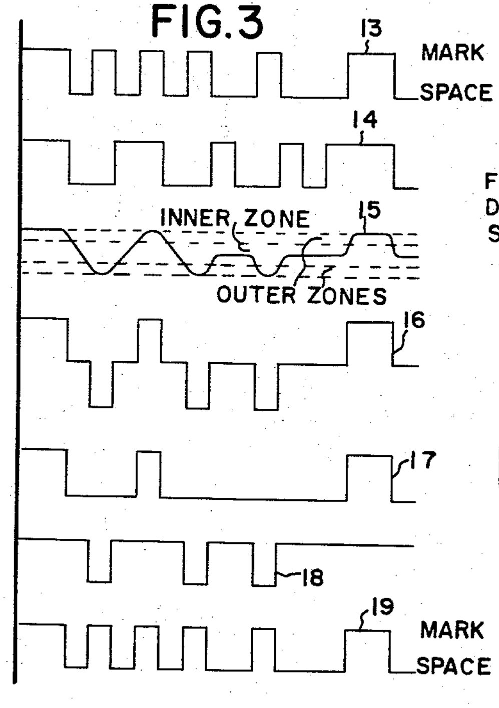
FIG. 2
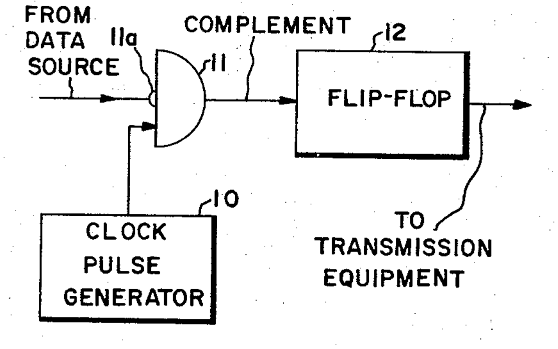
INVENTOR.
ADAM LENDER
BY
Lippincott, Ralls & Hendricson
ATTORNEYS INVENTOR.
ADAM LENDER
BY
Lippincott, Ralls & Hendricson
ATTORNEYS INVENTOR.
ADAM LENDER
BY
Lippincott, Ralls & Hendricson
ATTORNEYS INVENTOR.
ADAM LENDER
BY
Lippincott, Ralls & Hendricson
ATTORNEYS United States Patent Office 3,337,864

Patented Aug. 22, 1967

3,337,864

DUOBINARY CONVERSION, RECONVERSION AND ERROR DETECTION

Adam Lender, Palo Alto, Calif., assignor, by mesne assignments, to Automatic Electric Laboratories, Inc., Northlake, Ill., a corporation of Delaware Filed Aug. 1, 1963, Ser. No. 299,379
16 Claims. (Cl. 340—347)

ABSTRACT OF THE DISCLOSURE

The present invention is directed to an improvement in high-speed data transmission employing duobinary waveforms. There is herein provided method and apparatus for the conversion of binary waveforms into duobinary waveforms, and for the reconversion of duobinary waveforms into binary waveforms, for the purpose of increasing the speed of data transmission. The invention also provides improved and simplified error detection operating upon the sequence of received duobinary signal levels to indicate the occurrence of transmission errors without the introduction of redundant digits.

This invention relates to a duobinary transmission system, and in particular to apparatus for converting a conventional binary waveform into a duobinary waveform (converter) and apparatus for reconverting the duobinary waveform to binary (reconverter). The system also includes an error detector which senses errors occurring in transmission. This application is a continuation-in-part of co-pending applications Ser. No. 206,747, now Patent No. 3,238,299, and 245,324, now Patent No. 3,234,465, by the same inventor and assigned to the same assignee as this invention.

The duobinary system is a new data system which has the full speed capacity of conventional quaternary systems, yet still requires only the circuitry and equipment normally necessary for a conventional binary system. Consequently, the duobinary system provides the increased speed and superior performance of a quaternary system without its increased complexity. Furthermore, the duobinary signal has built-in error checks which make possible error detection without the usual introduction of redundancies. The system is useful in serial and parallel transmission over any communication medium such as, for example, wire lines or high frequency radio.

It is well known in the art that the maximum transmission rate over a channel of limited bandwidth is restricted by Nyquist's rule, which may be expressed:

$$\frac{C}{f_1}=2\log_2 b \text{ (bits per second/cycle of bandwidth)}$$

where $C$= bits per second, $f_1$=cutoff frequency of the lowpass filter employed, and $b$=number of discrete signaling levels.

In a carrier transmission system over a bandpass transmission medium with both sidebands present, the equivalent expression is $$\frac{C}{f_1}=\log_2 b \text{ bits per second/cycle of bandwidth}$$

Thus, with binary transmission the speed for a baseband system, calculated from the above expression is 2 bits/second/cycle. With quaternary transmission, the speed if 4 bits/second/cycle. Using carrier (both sidebands) transmission, these speeds would be 1 bit/second/cycle and 2 bits/second/cycle, respectively. Because of the ever-increasing need for higher speeds, quaternary systems have in the past been preferred, the most widely used being the highly complex differentially coherent four-phase modulation.

In some data applications, however, differentially coherent four-phase modulation proves impractical. In four-phase modulation, the data bits must be synchronized with the carrier frequency, restricting operation to one, or at most two, discrete bit speeds. Also, when two orthogonal channels must be converted into a single data stream, clock synchronization timing recovery at the receiver is required. Retiming is also necessary when periodic integration detection is employed in a four-phase modulation system. In none of the above cases can any flexibility in transmission speed be tolerated. Nevertheless, many data transmitters give rise to a certain amount of inherent transmission speed variation. For example, even the best magnetic tape transports have some speed variations, however slight, which will produce equivalent variations in their data bit speed. Such variations may effectively preclude the use of differentially coherent four-phase modulation as a transmission method.

The duobinary system of this invention, as discussed above, provides the higher bit speeds of a quaternary system, but eliminates some of the major disadvantages such as lack of flexibility. Nevertheless, the performance of the duobinary system equals that of the quaternary system with a wire line transmission medium, and exceeds it on high-frequency radio. Two important advantages of the duobinary system are (1) that it permits bit-speed flexibility, and (2) that it provides a correlation between pulses which makes error detection possible without any introduction of redundancies. Redundancies are certain extra pulses which are normally introduced along with the transmitted signal. At the receiving end, these redundancies are checked for certain predetermined correspondence with the transmitted signals. Should this correspondence fail, errors are known to have been made. An error detection scheme based upon the introduction of redundancies has certain inherent disadvantages. First, additional equipment is required at the transmission end of the system to introduce the redundancies; extra equipment is also required at the receiver to remove them. Second, the transmission of the extra bits which contain no actual data, solely for error detection, necessarily reduces the number of useful data bits which can be transmitted in a given time, thus slowing down data transmission.

Still another important advantage of the duobinary system is its ready accommodation to use with a phase-modulated carrier. In coherent phase modulation of digital data, the recovered reference carrier is sometimes reversed 180° in transmission. Such a reversal would normally result in the recovered waveform showing peaks where valleys should be, and vice versa. However, since peaks and valleys in the duobinary system represent identical binary data bits, any phase reversal makes no difference—the reconverter will produce the correct data in either event.

Prior to a brief discussion of the duobinary coding, it is interesting to note the derivation of the term "duobinary." The base "binary" relates to the fact that the duobinary waveform is a quasi-binary waveform, although it has three detectable amplitude zones rather than two (as would be normal for a pure binary waveform). The prefix "duo" is used to indicate that the bit capacity is double that of a straight binary system. Later in this specification, it will be demonstrated that the duobinary waveform further provides a two-to-one bandwidth compression of a conventional binary waveform.

The duobinary code should not be confused with other codes which also employ three amplitude levels, namely: ternary and pseudo-ternary codes. The ternary code is a multilevel code where each digit represents $\log_2 3$ bits of information. The digits are independent; transition from any level to any other level is possible. Pseudo-ternary codes eliminate DC, but occupy the same bandwith and have the same bit speed capacity as a pure binary code. In pesudo-ternary, also, a transition from any level to any other level may occur. For the sake of clarity, the information capacity of various codes used in baseband transmission is shown below.

| Type of code: | Information capacity (bits/sec./cycle) |
|---|---|
| Binary | 2.0 |
| Ternary | 3.16 |
| Pseudo-ternary | 2 |
| Quaternary | 4 |
| Duobinary | 4 |

To understand the derivation of the duobinary sequence, consider two sequences of digits. The first is a binary sequence $a_n$ where:

$$a_n = 1 \text{ or } 0 \text{ (MARK or SPACE, respectively)}$$

with $$p(1) = p(0) = \tfrac{1}{2}$$

where p denotes probability.

The second sequence is a duobinary sequence $b_n$, derived from the binary sequence $a_n$, where:

$$b_n = +\tfrac{1}{2},\ 0,\ \text{or } -\tfrac{1}{2}$$

or, for the sake of brevity, $$b_n = +,\ 0,\ \text{or } -$$

The binary sequence $a_n$ is transformed into the duobinary sequence $b_n$ in accordance with the following rules:

When $a_n=0$, $b_n=0$.

When $a_n=1$, the polarity of $b_n$ depends upon the polarity of $b_{n-k}$ corresponding to $a_{n-k}$, which was the last $a_n=1$. If $a_n$ and $a_{n-k}$ are separated by an even number of zeros (i.e., $k-1$ is an even number), $b_n=+b_{n-k}$. With an odd $(k-1)$, $b_n=-b_{n-k}$.

Stated in words, for a binary pulse of one amplitude level (either MARK or SPACE—for this illustration, let us assume SPACE), the corresponding duobinary pulse will have a value of 0, falling within the inner one of the three amplitude zones. For a binary pulse of the other amplitude level (MARK), the value of the corresponding duobinary pulse will be either + or −; that is, it will lie in one of the two outer amplitude zones. The first outer-zone pulse in a sequence may lie indifferently in either of the two outer zones; however, this outer zone pulse sets the pattern for the sequence.

Let us assume that a first outer-zone duobinary pulse (corresponding to a binary MARK) lies in the upper zone (+). The location of the next outer-zone duobinary pulse (corresponding to the next binary MARK) will depend upon the number of intervening inner-zone duobinary pulses (corresponding to binary SPACES). Should an even number of inner-zone pulses intervene (zero being here considered an even number), the next outer-zone pulse will be located in the same outer zone as its predecessor; should an odd number of pulses intervene, the next outer-zone pulse will be located in the zone opposite to its predecessor. For example, when the first outer-zone pulse lies in the upper zone (+), the next one will lie in the lower zone (−) if an odd number of inner-zone pulses intervenes, but will lie again in the upper zone if an even number of inner-zone pulses intervenes.

This pattern provides built-in error detection. Most errors or groups of errors which violate the duobinary pattern can be detected readily. For instance, if a lower-zone pulse were to be followed by four (even number) successive inner-zone pulses, but the next outer-zone pulse fell in the upper zone, such a violation of the duobinary rule would immediately be noticed. Most such pattern violations can be detected by error detection apparatus, to be described later. Duobinary transmission has, in this ability to detect its own errors, a very important advantage over binary transmission, for example, which lacks any correlation between one bit and the next.

The following example illustrates the binary-duobinary conversion process:

BINARY sequence $a_n$: 000011001110110001101010000 111011

DUOBINARY sequence $b_n$: 0000++00+++0−−000 ++0−0+0000+++0−−

In sequence $b_n$, a transition from + to − (or vice versa) in two successive pulses is impossible. Consequently, both $a_n$ and $b_n$ sequences consist of NRZ (non-return-to-zero) pulses of identical duration (T seconds). The purpose of the above conversion is compression of the bandwidth of sequence $a_n$ by a factor of two. One effect of this transformation is that the sequence of uncorrelated digits $a_n$ is changed into a correlated sequence of digits $b_n$. In consequence, the spectral density of sequence $a_n$ is redistributed into a highly concentrated energy density near DC and low frequencies for the sequence $b_n$. This desired bandwidth compression and redistribution of spectral density may be demonstrated as follows:

The spectral density function W(*f*) of any pulse train is:

$$W(f) = \frac{1}{T}|G(f)|^2 \left\{ R(0) - m_1^2 + 2 \sum_{k=1}^{\infty} [R(k) - m_1^2] \cos 2\pi k f T \right\} \quad (1)$$

where $C$=speed in bits/second, $T=1/C$, $R(k)$=autocovariance of the sequence $b_n = av(b_n b_{n+k})$, and $G(f)$=the Fourier transform of the pulse shape.

For the duobinary sequence $b_n$:

$$p(0) = \tfrac{1}{2}, \text{ and } p(+\tfrac{1}{2}) = p(-\tfrac{1}{2}) = \tfrac{1}{4} \quad (2)$$

where $p$ denotes probability.

From Equation 2, it is observed that the mean value of $b_n$, termed $m_1$, is $$m_1 = av(b_n) = 0 \quad (3)$$

In evaluating the autocovariance R($k$) for various values of $k$, all patterns of $(k+1)$ digits in the sequence $a_n$ which results in non-zero terms of R($k$) must be considered. Such patterns of $a_n$ start with 1 and end with 1. The probability of each pattern is $1/2^{k+1}$. The values of the product $(b_n b_{n+k})$ in the sequence $b_n$ corresponding to those $a_n$ patterns which begin and end with 1 are either $(+\tfrac{1}{4})$ or $(-\tfrac{1}{4})$. Therefore, by induction, using all values of $k$, it can be shown that $$R(k) = av(b_n b_{n+k}) = \left(\frac{1}{2^{k+1}}\right)(\tfrac{1}{4}) = \frac{\Delta}{2^{k+3}} \quad (4)$$

where Δ=total number of patterns with positive values of $(b_n b_{n+k})$ less the total number of patterns with negative values of $(b_n b_{n+k})$. Also:

$$R(0) = av(b_n^2) = \tfrac{1}{8} \quad (5)$$

Values of R($k$) for $k>1$ are obtained as follows. For each $k$, there are $2^{k-1}$ patterns in the sequence $a_n$ which begin and end with 1. For $k=1$, there is only one such pattern, namely, "11." For the case where $k=1$, the value of $(b_n b_{n+k})$ is positive, since there is an even number of zeros (none) between $b_n$ and $b_{n+k}$. When $k$ is increased by one, the number of such patterns doubles. The new patterns are formed in the following manner. A zero is added to all patterns corresponding to the value of the previous $k$ in position $b_{n+1}$. Then a 1 is added to all these patterns in the same position. It is observed that $b_n$ is always a one, and the addition of a zero in position $b_{n+1}$ will invariably change $(b_n b_{n+k})$ to its opposite value.

Moreover, a 1 added in position $b_{n+1}$ will never change the value of $(b_n b_{n+k})$. Consequently, the pattern of $(b_n b_{n+k})$ values is easily calculated, and is shown below for some values of $k$.

VALUES OF PRODUCT $(b_n b_{n+k})$

| k=1 | k=2 | k=3 |
|---|---|---|
| + | − | + |
| | + | − |
| | | − |
| | | + |

From the above table, for $k=1$, $\Delta=1$; and $$\Delta=0 \text{ for } k>1 \quad (6)$$

As a result from Equation 4:

$$R(1)=1/16 \quad (7)$$
$$R(k) \text{ for } k>1=0$$

If the values of $m_1$, R(0), and R($k$) from Equations 3, 5, and 7, respectively, are substituted in Equation 1, to obtain $W_2(f)$, the spectral density for the duobinary pulse sequence is:

$$W_2(f)=\frac{1}{4T}|G(f)|^2\frac{(1+\cos 2\pi fT)}{2} \quad (8)$$

For a binary sequence $a_n$, it is well known that the spectral density $W_1(f)$ is:

$$W_1(f)=\frac{1}{4T}|G(f)|^2 \quad (9)$$

For rectangular pulses, it is known that the Fourier transform of the pulse shape G($f$) is:

$$G(f)=T\left(\frac{\sin \pi fT}{\pi fT}\right) \quad (10)$$

The substitution of Equation 10 for rectangular pulses into the spectral density Equations 8 and 9 for the sequences $a_n$ and $b_n$, results in the following equations for the spectral densities of the binary and duobinary sequences, respectively:

$$W_1(f)=\frac{T}{4}\left(\frac{\sin \pi fT}{\pi fT}\right)^2 \quad (11)$$

for binary, and $$W_2(f)=\frac{T}{4}\left(\frac{\sin 2\pi fT}{2\pi fT}\right)^2 \quad (12)$$

for duobinary.

Comparison of the resultant expressions (11) and (12) demonstrates that an exact two-to-one bandwidth compression is obtained in the duobinary sequence (compared with the binary). Comparison of the spectral densities in (8) and (9) also leads to a method for conversion of a binary sequence $a_n$ to a duobinary sequence $b_n$. From Equations 8 and 9, it can be observed that the spectral densities of the two sequences differ only by the factor $$2(1+\cos 2\pi f\mathrm{T})$$

which can be transformed as follows:

$$2(1+\cos 2\pi f\mathrm{T})=|1+e^{-j\omega \mathrm{T}}|^2$$

The transformed conversion factor $$|1+e^{-j\omega \mathrm{T}}|^2$$

unexpectedly points the way to a unique method of converting a binary sequence or waveform $a_n$ into a duobinary sequence or waveform $b_n$ in two steps.

First, the sequence $a_n$ is digitally differentiated to obtain the differential sequenced $d_n$. Apparatus for carrying out this transition is known in the art. In sequence $d_n$, a MARK represents "no change" between two binary states in sequence $a_n$, and a SPACE represents a "change."

The digital differential sequence $d_n$ is still binary, and consequently its statistics, including its spectral density, are the same as those for sequence $a_n$, shown in Equation 9 above.

The second required step is the arithmetic addition of the sequence $d_n$ to its replica delayed by a single digit interval. The resulting sequence or waveform is then $b_n$.

Various types of apparatus may be employed to achieve conversion from binary to duobinary, and reconversion to binary. Such apparatus will produce the following pulses:

(1) From each binary pulse of a given amplitude level (here arbitrarily chosen to be SPACE), a duobinary pulse of inner-zone (0) amplitude;

(2) From each binary pulse of the other amplitude level (MARK) following the first by an even number of consecutive binary SPACES, a duobinary pulse in the same outer amplitude zone as the one to which the preceding MARK was converted; and (3) From each binary pulse of the other amplitude level (MARK) following the first by an odd number of consecutive binary SPACES, a duobinary pulse in the opposite outer amplitude zone from the one to which the preceding MARK was converted.

By comparison of the spectral densities of the binary and duobinary sequences (Equations 8 and 9 above), one method of obtaining the above conversion was demonstrated: a digital differentiation step followed by arithmetic summation of the digitally-differentiated sequence with itself delayed by one bit duration. An alternative method would be the employment of a low-pass filter instead of the one-bit delay and the arithmetic summer. In some instances, a one-bit delay, a summer, and a filter may all be used together. These details will be more fully explained later.

Apparatus for reconversion of the duobinary waveform to the binary is also part of this invention. Such apparatus includes a detector for detecting the amplitude level of outer-zone pulses. The detector provides output pulses of one polarity upon detection of a duobinary pulse lying in either outer zone, and pulses of the opposite polarity upon detection of pulses lying in the inner zone (sometimes indicated by the absence of any outer zone pulse).

As mentioned above, the duobinary sequence provides a natural correlation between pulses, thereby facilitating the detection of errors in duobinary-binary reconversion. Various types of such error detection equipment may be employed. One type uses a feedback loop which causes each error signal to alter the sensing sequence in compensation. Both the converted duobinary and reconverted binary waveforms may appear as inputs to the detector, or the duobinary waveform alone may be used. However, all the systems use four essential parts. One part remembers the location of the last outer-zone duobinary pulse; the second determines whether the number in each group of consecutive inner-zone pulses is even or odd; the third ascertains the actual location of each outer-zone pulse; and the fourth compares this with the predicted location for that pulse based on the duobinary waveform rules.

The details of the apparatus of this invention will become clearer from a study of the following more detailed description, making reference to the drawings, in which:

FIG. 1 is a block diagram of a binary-duobinary conversion and reconversion system of the invention, including a retiming apparatus;

FIG. 2 is a block diagram of a digital differentiator;

FIG. 3 shows data waveforms at various states of transmission using the apparatus of this invention;

Figure 4:
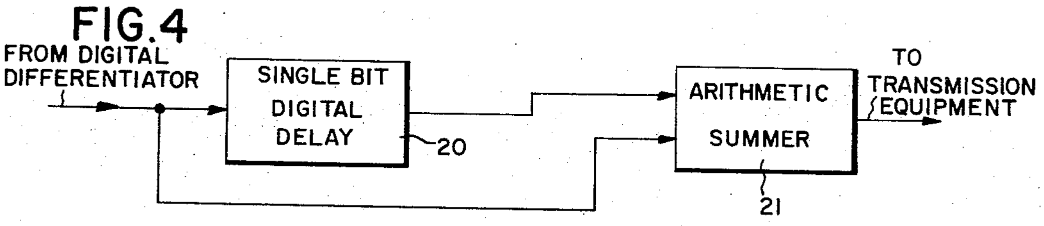
FIG. 4 is a block diagram of one type of converter which may be used in the system.

Referring to FIG. 1, binary data is generated by a binary data source 1. The data source used for this invention is conventional; however, the bit speed of the data entering the transmission equipment may be nearly four times the frequency bandwidth limit of the system. Such a speed is twice that previously possible for a conventional binary system, and equals the rate heretofore considered applicable to a quaternary system. Using the apparatus of the invention, a reconstructible signal can be transmitted at a bit rate ranging up to four times the frequency bandwidth of the system. Although this is not an absolute limit, the error rate above this factor (at 4.5 times the bandwidth, for example) becomes too high.

The binary data is next passed to converter 2. In one embodiment of the invention, converter 2 uses a digital differentiator connected to a single bit digital delay coupled to an arithmetic summer. A block diagram of a digital differentiator is shown in FIG. 2. Referring to this figure, a SPACE appearing from the data source causes AND-gate 11 to have an output pulse; otherwise, it has none. Since a SPACE is generally a "negative" pulse, for use with an AND-gate requiring a positive input pulse, the input pulses from the data source are first passed through a conventional inhibitor (or inverter). This inhibitor **11*a* is shown on AND-gate 11** by its conventional symbol (a small semicircle) at the appropriate input from the data source.

An output pulse from gate 11 complements flip-flop 12; as a result, flip-flop 12 changes state only when a SPACE appears from the data source. The data waveform is converted from the waveform 13 shown in FIG. 3 to waveform 14. Use of a clock pulse generator 10 in the transmitter is conventional. The clock pulse generator is a circuit set to generate pulses at a fixed frequency equal to the bit rate. The clock pulses are phased with the data digits emanating from the data source. Waveform 14 emerging from flip-flop 12 represents the digital differential of the original input data. Waveform 14 is next passed to the delay and summation apparatus shown in FIG. 4, which uses a single-bit digital delay 20. Such a delay, sometimes referred to as a "one-bit shift register," delays a binary digit train by an interval equal to one digit. The input (from the digital differentiator) is connected both to the delay 20 and to the arithmetic summer 21. The output of delay 20 in turn is connected to the other input of summer 21. An arithmetic summer is merely a pair of resistors having a common terminal; the two separate terminals comprise the two inputs to the summer and the common terminal constitutes the output. Thus summer 21 adds the digital differential output waveform arithmetically to itself delayed by one bit. The output of summer 21 is a duobinary waveform, satisfying all the principles discussed above. All the operations carried out upon the binary waveform, both in the differentiator and in the summer, are digital; therefore the resulting duobinary waveform has square pulses, shown as waveform 16 of FIG. 3.

When the converter described above is employed, transmission speed may be varied at will anywhere within the operable range of the invention, because conversion to the duobinary waveform occurs prior to entrance of the signal into any lowpass filter. The flexibility permitted by such apparatus is extremely advantageous where transmission speed changes are likely to occur. The above converter makes possible a flexible-speed system not feasible with prior-art coherent four-phase modulation systems (as explained earlier). Still another advantage of this type of converter is reduction of intersymbol interference, and consequent increase in the receiver's signal-to-noise ratio.

Another type of converter which may be used in this invention also employs a digital differentiator (FIG. 2) as its first stage, but in place of the delay 20 and summer 21 shown in FIG. 4, a conventional low-pass filter follows the digital differentiator. The nominal bandwidth of such a filter is a function of the intended transmission bit speed. This nominal bandwidth in cycles/second (or c.p.s.) is numerically equal to one-quarter of the bit speed in bits/second. The nominal bandwidth of a low-pass filter is that bandwidth below which attenuation is negligible and above which attenuation is high. This low-pass filter accomplishes the same result in an analog manner as the apparatus of FIG. 4 did in a digital manner. When a lowpass filter is used, the resultant duobinary waveform has an undulating shape, shown in waveform 15 of FIG. 3. However, when either of these two waveforms 15 or 16 is passed through a pair of slicers, the resulting output waveforms 17 and 18, when added, will be identical to waveform 19.

Moreover, a lowpass filter may be used in the transmitter in addition to the digital apparatus of FIG. 4. Such a supplementary filter, however, is a much less critical part of the conversion apparatus than the same filter would be if used alone. Hence, the supplementary lowpass filter may be manufactured to less critical tolerances. The purpose of such a filter is merely the conversion of square waveform 16 shown in FIG. 3 (which has infinite bandwidth) to the rounded waveform 15 (which has a limited bandwidth determined by the filter). The latter waveform is easily transmitted over conventional transmission equipment.

If desired, the data may be carrier modulated. Because linear modulation systems are well known in the art, it is not believed necessary to discuss them in detail here. Amplitude modulation, frequency modulation, phase modulation (either analog or coherent digital), or other methods of carrier modulation may be used. A specific example of one type of carrier modulation and transmission equipment, FM, is shown in FIG. 5.

Figure 5:
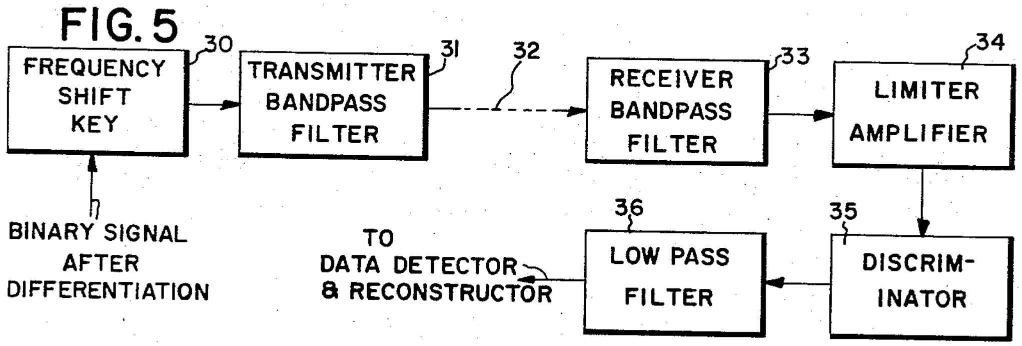
FIG. 5 is a block diagram of FM transmision equipment.

Referring now to FIG. 5, binary pulses from the digital differentiator of FIG. 2 are passed to a frequency shift key 30. The frequency shift key may be a single oscillator, keyed in a strictly binary manner by switching a fixed capacitor in or out. This shift key alternates between two fixed frequencies, according to the state of the differentiated signal. The difference between these two frequencies equals numerically one-half the bit speed in bits per second. The binary-keyed wave emitted from frequency shift key 20 is applied to a transmitter bandpass filter 31, which signal is then sent across a transmission medium 32 (a cable, H-F radio, etc.) to the receiver. Receiver bandpass filter 33, the limiter amplifier 34, the discriminator 35 and the lowpass filter 36 perform linear demodulation. The lowpass filter 36 also converts the digitally differentiated waveform 14 to the duobinary waveform 15 in the analog manner.

The bandwidth of lowpass filter 36 is selected exactly as described above (as a function of the bit speed). Similarly, the bandwidths of filters 31 and 32 are functions of bit speed, having a nominal bandwidth (in c.p.s.) numerically equal to one-half the bit speed C (in bits/second). These filters have very high attenuation above the upper shift frequency and below the lower shift frequency, and very low attenuation within the bandpass range.

The substantial advantages provided by the apparatus of this invention, using the above FM transmission system, may be seen from the following example.

*Example*

A system having the data detector and reconstructor shown in FIG. 1 was tested, using an optimized FM transmission apparatus such as that shown in FIG. 5. The system was designed for a parallel 16-channel application for a total of 2,560 bits/second over high-frequency radio voice channels, all with identical bandwidths. The test, however, was conducted using only a single channel whose parameters were the following:

BIT SPEED—160 bits/second
CENTER FREQUENCY—2125 c.p.s.
SHIFT FREQUENCIES—2085 and 2165 c.p.s.
CHANNEL BANDWIDTH—100 c.p.s.
THERMAL NOISE—flat In spite of this substantial increase in speed over a conventional binary system, the input signal was unambiguously reconstructed at the output.

Referring again to FIGS. 1 and 3, the duobinary waveform following the transmission of the data through medium 3, must be reconverted to its original binary form. Reconverter 4 is shown coupled to transmission medium 3. The reconverter uses two slicers 5 and 6 to detect outer-zone duobinary pulses. Slicer 5 detects the upper zone pulses and slicer 6 detects the lower zone pulses. Waveform 17 of FIG. 3, containing five upper zone pulses, shows a typical output waveform from slicer 5. Two pairs of adjacent pulses at either end are shown; the intervening pulse is a single pulse. Similarly, a typical output waveform of slicer 6 is shown in FIG. 3 as waveform 18, having three single lower zone pulses. Inverter 7 of FIG. 1 inverts the output waveform 18 of slicer 6, and arithmetic summer 8 with appropriate bias adjustment adds this inverted output waveform to the output waveform of slicer 5. Waveform 19 is the resultant output waveform. Comparison of waveform 19 with the input binary waveform 13 shows the two to be identical.

In applications of the system where waveform 19 of FIG. 3 shows an appreciable amount of time jitter relative to the bit duration, retiming circuit 9 (shown in FIG. 1) is a helpful addition. This retiming circuit 9 comprises two AND-gates 22 and 23, a flip-flop 24, and a clock pulse generator 25. (All of the AND-gates used and described herein are of the type which has an output only when all inputs are positive.) The first AND-gate 22 has one input coupled to the output of reconverter 4 and another coupled to clock pulse generator 25. The output of AND-gate 22 is connected to the SET input of flip-flop 24. One input of AND-gate 23 is connected to the output of reconverter 4 and the other to clock pulse generator 5; the output is connected to the RESET input of flip-flop 24.

The error detection portion of the apparatus of this invention differs considerably from conventional systems. Briefly, the apparatus of this invention uses a binary counter to determine whether the number of consecutive inner-zone duobinary pulses in the signal is even or odd. The apparatus also remembers the location of the last outer-zone pulse (upper or lower) and from this information continuously predicts the location of the next outer-zone pulse. The actual location of each outer-zone pulse as its occurs is compared with the prediction; when the predicted and actual locations fail to agree, one or more errors is known to have occurred. The signals indicating an error or group of errors may then be counted, if desired, or any other preferred procedure followed to determine the degree of transmission medium impairment.

Figure 6:
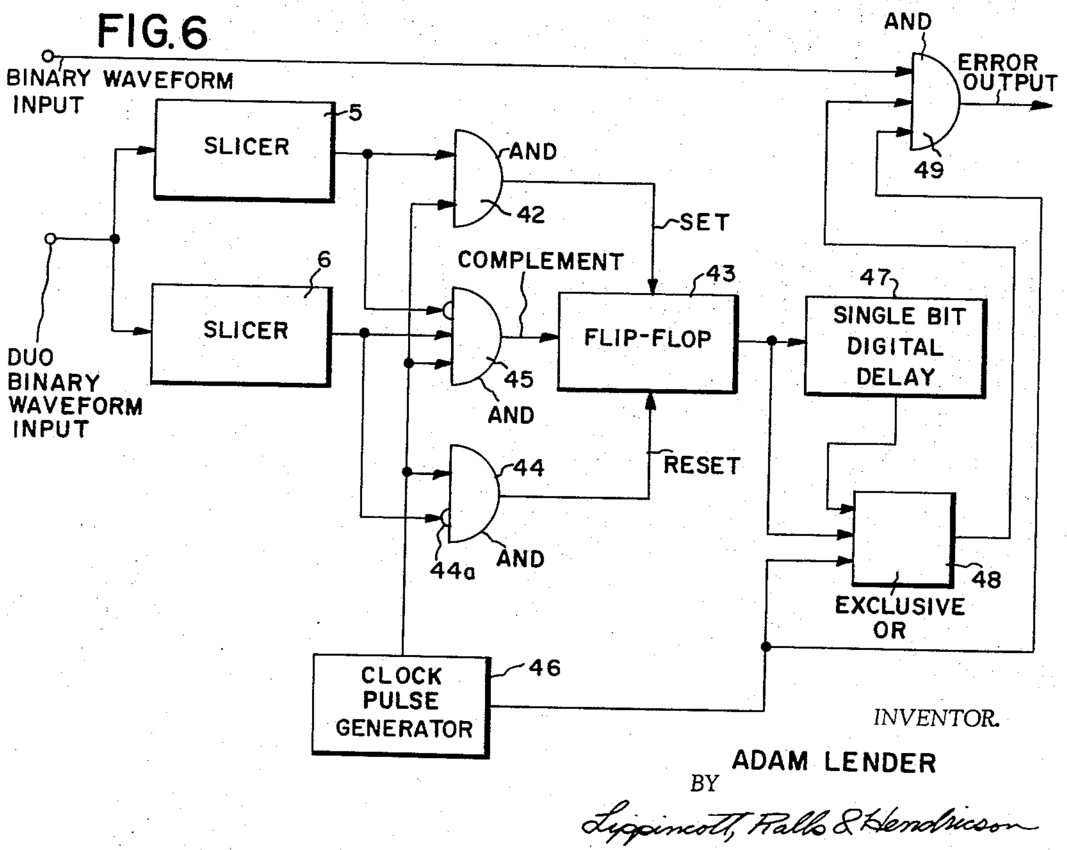
FIG. 6 is a block diagram of error detection apparatus of the invention operating on both binary and duobinary waveforms.

Turning now to specific embodiments of apparatus which may be used to detect erors in a duobinary waveform, reference is first made to FIG. 6. In this embodiment, slicers 5 and 6 detect the location of duobinary pulses; slicer 5 produces a positive output pulse when its input receives an upper zone pulse, and slicer 6 produces a negative output pulse when its input receives a lower zone pulse. When slicer 5 has a negative pulse output and slicer 6 a positive pulse output, an inner zone pulse is indicated. These slicers have appeared earlier as slicers 5 and 6 in the reconversion apparatus of FIG. 1. Almost always, the same slicers used in the reconverter will provide the signals to the error detector, because their outputs are conveniently available. However, if preferred for any reason, separate slicers may be used for the error detection apparatus.

AND-gate 42 connects the output of slicer 5 with the SET input of flip-flop 43; each upper-zone duobinary pulse received SETS this flip-flop. Slicer 6 provides a negative output pulse when a lower-zone pulse is detected; this output pulse is converted to a positive pulse by inhibitor 44*a* and passed to the RESET input of flip-flop 43 through AND-gate 44. Thus, a lower-zone duobinary pulse causes flip-flop 43 to be RESET. AND-gate 45 is connected to provide an output pulse whenever receipt of an inner-zone pulse is detected. Such a pulse is indicated by a negative output pulse from slicer 5 and a positive output pulse from slicer 6. The output of AND-gate 45 is connected to the COMPLEMENT input of flip-flop 43, so that each inner-zone duobinary pulse will COMPLEMENT the flip-flop (i.e., change its state). Clock pulse generator 46 is used to gate all three AND-gates 42, 44, and 45.

Flip-flop 43 continually checks the number of inner-zone duobinary pulses. Each inner zone pulse causes the state of flip-flop 43 to be changed (complemented); the single-bit digital delay 47 will always indicate the state of the previous pulse. For example, suppose an upper-zone pulse to have been received, placing flip-flop 43 in the SET condition. The first inner-zone pulse received will complement the flip-flop to RESET and delay flip-flop 47 to SET (the previous state of flip-flop 43). With flip-flop 43 RESET and delay 47 SET, exclusive-or gate 48 will have an output pulse gated with a pulse from clock 46. However, since the duobinary pulse being checked is an inner-zone pulse (corresponding to binary SPACE), no positive pulse will appear at the binary waveform input to gate 49 (because a positive pulse occurs only on a MARK). In consequence, AND-gate 49 which requires all positive input pulses can produce no output pulse despite the output pulses from exclusive-or gate 48 during the SPACE condition. Suppose now the next duobinary pulse to be another inner-zone pulse. Flip-flop 43 will then be complemented from RESET to SET and delay 47 from SET to RESET, the previous state of flip-flop 43; exclusive-or gate 48 will have an output pulse again; but AND-gate 49 will still lack one input, because again the inner-zone pulse corresponds to a binary SPACE (a negative pulse).

The next outer-zone pulse received should, by the duobinary rules, have the same location as the previous outer-zone pulse (upper zone) because two inner-zone pulses intervened (even number). If this pulse proves to be in fact located in the upper zone, flip-flop 43 will remain SET and delay 47 will become SET (the previous condition of flip-flop 43). Now both flip-flop 43 and delay 47 are SET, and exclusive-or gate 48 will produce no output pulse because its two principal inputs are alike. An exclusive-or gate produces an output pulse only when the polarities of the two inputs (excluding the clock) are opposite. If both inputs—excluding the clock—provide pulses of the same polarity, the exclusive-or gate will have no output pulse. Consequently, AND-gate 49 lacks an input pulse and in turn will have no output pulse.

Suppose that in the example above, because of previous errors, the last-received outer duobinary pulse were a lower-zone pulse instead of an upper. Flip-flop 43 would then have been RESET, and delay 47 SET; their output pulses would have differed in polarity, and exclusive-or gate 48 would then have produced an output pulse. This pulse would have corresponded in time with a positive binary pulse or MARK (which had been converted to the outer-zone duobinary pulse). AND-gate 49 would thus have had two positive input pulses (one from the binary MARK and one from exclusive-or gate 48), and an output pulse would have been produced, indicating that the last duobinary outer-zone pulse received was located in the wrong zone—in violation of the fundamental duobinary rules.

More generally, most of the errors which will cause violations of the duobinary pattern are detected by the apparatus of this invention. The SPACES between two successive marks are counted by flip-flop 43 as a result of the inner-zone duobinary pulses being fed to the complement input of flip-flop 43 from AND-gate 45. Flip-flop 43 thus changes state with each successive SPACE. During a succession of SPACES, flip-flop 43 and delay 47 will always indicate opposite polarity states (because the present state of flip-flop 43 continues to be opposite from the previous one). Therefore, during a binary SPACE, exclusive-or gate 48 will always have an output pulse. However, AND-gate 49 can never have an output pulse during a binary SPACE since such a pulse is negative, denying to AND-gate 49 one of its requisite positive input pulses.

Errors are detected during the first MARK following the last of a sequence of SPACES (one or more). If the duobinary pattern has not been violated during the sequence, the last SPACE will place flip-flop 43 in the state corresponding to the polarity of the next following MARK (SET or RESET). On the other hand, should the duobinary pattern have been traversed during the sequence, the last SPACE will place flip-flop 43 in the state opposite to the polarity of the next following MARK. The violation will also place delay 47 in the condition opposite from flip-flop 43; with flip-flop 43 and delay 47 in opposite states, exclusive-or gate 48 will produce an output pulse which is passed to AND-gate 49. Since these conditions are all extant during a binary MARK, AND-gate 49 will also have a positive input pulse from the MARK, and will thus provide the output signal to indicate an error.

Successive MARKS are placed by the duobinary rules in the same outer zone if no violation has occurred. However, should two such MARKS have opposite polarity (be located in opposite outer zones), flip-flop 43 and delay 47 will again have opposite polarity states (one from the present MARK and the other from the preceding MARK), exclusive-or gate 48 and AND-gate 49 will combine to produce an output signal indicating an error.

Because AND-gate 49 has one input connected to the binary waveform, errors will be indicated only during a binary MARK. The apparatus shown in FIG. 6 is therefore designed for use when binary MARKS are converted to duobinary outer-zone pulses, and binary SPACES to duobinary inner-zone pulses. Were the reverse the case, of course, it is apparent that use of inhibitors, properly placed, would render the apparatus operative in the desired manner.

Figure 7:
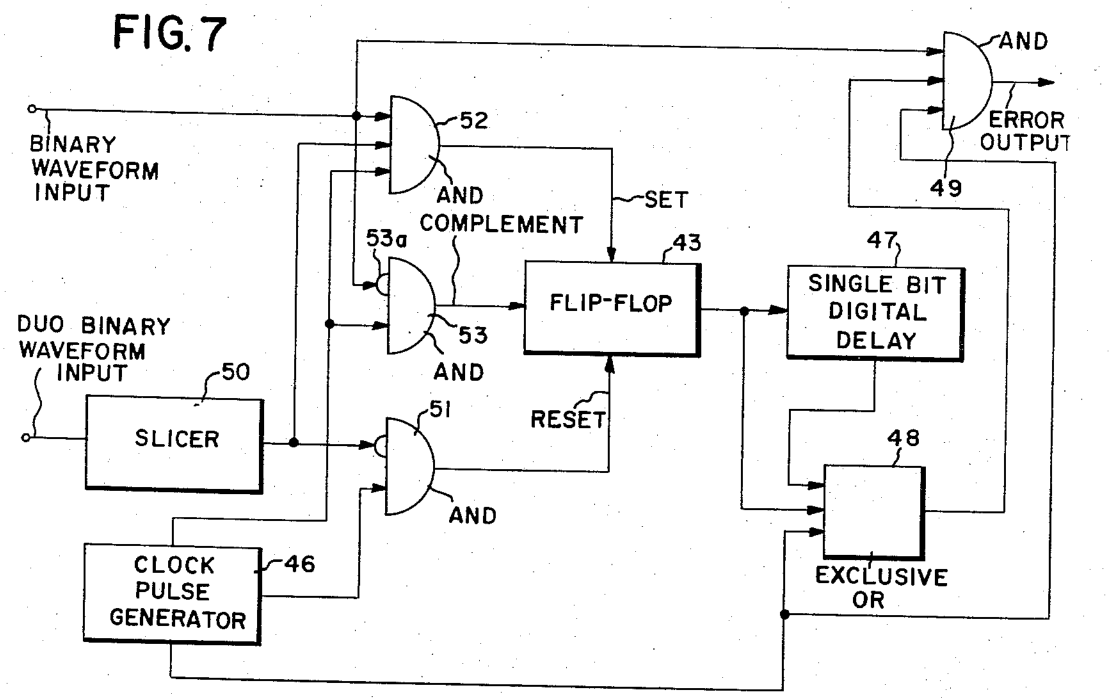
FIG. 7 is a block diagram of another embodiment of the error detection apparatus of this invention, also operating on both binary and duobinary waveforms.

The error detection apparatus shown in FIG. 7 operates in much the same manner as that shown in FIG. 6 but the embodiment of FIG. 7 requires only a single slicer. Obviously, elimination of one slicer represents a definite saving in equipment; even more important, the data reconverted described in copending application Ser. No. 245,-324 (of the same inventor and assigned to the same assignee as the present application) requires only a single slicer. Consequently, the error detection apparatus of FIG. 7 may easily be used in conjunction with that reconverter, taking its slicer output signal from the single available slicer. Such an arrangement would not be possible using the embodiment of FIG. 6, because that embodiment requires two slicer output signals.

Referring now to FIG. 7, flip-flop 43, clock pulse generator 46, single-bit digital delay 47, exclusive-or gate 48, and AND-gate 49 are identical in function and reference number to those in FIG. 6. The differences between the two embodiments arise in the input section. There are input pulses to flip-flop 43 to indicate duobinary pulses in each zone. Slicer 50, which may form part of a reconverter, as discussed earlier, detects pulses in only one of the outer zones (e.g., the lower zone), and emits a negative output pulse in response thereto. Of course, slicer 50 could, with proper circuit modifications, be connected to detect upper zone pulses, if desired.

AND-gate 51 transmits a positive pulse to the RESET input of flip-flop 43 whenever a lower-zone duobinary pulse is detected by slicer 50 coincident with a clock pulse. AND-gate 52 has three inputs—one, of course, comes from clock 43; another is connected to receive the reconverted binary waveform and is pulsed whenever the binary waveform has a MARK. The third input is pulsed when slicer 50 has no lower-zone output pulse. As a result, AND-gate 52 provides an output pulse whenever an upper-zone duobinary pulse results from a binary MARK. The output pulses from AND-gate 52, indicating such pulses, are transmitted to the SET input of flip-flop 43.

One input of AND-gate 53 is connected to receive the reconverted binary waveform, but inverted by inhibitor 53*a*. The other input is connected to clock 46. AND-gate 53 will thus provide an output pulse to the complement input of flip-flop 43 during a binary SPACE. (A binary SPACE is always converted to an inner-zone duobinary pulse.) Hence, flip-flop 43 is complemented on inner-zone duobinary pulses, as was the case in the previous embodiment.

Since the output pulses from AND-gates 52, 51, and 53 are identical to those in the previous embodiment, and the remaining equipment is also identical, the operation of this embodiment is the same as that of the last, and therefore need not be redescribed.

Figure 8:
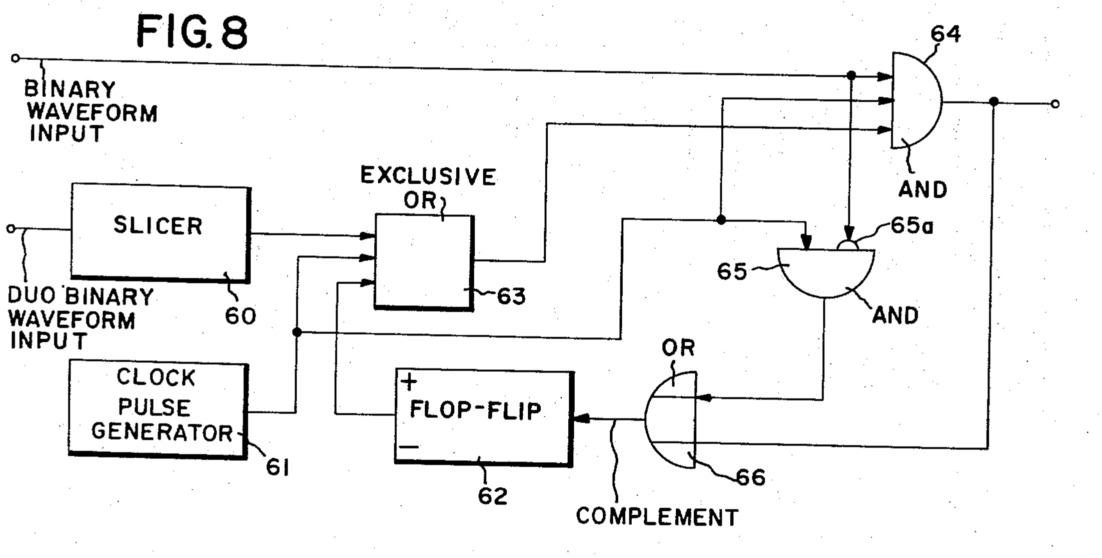
FIG. 8 is a block diagram of a third embodiment of error detection apparatus operating on both binary and duobinary waveforms, this embodiment using a feedback loop to change the polarity of the flip-flop upon each error sensing.

Another type of error detection apparatus according to the invention is shown in FIG. 8. The apparatus of this embodiment requires no digital delay. Slicer 60 again represents the slicer in the reconverter, as in the error detectors decribed above, and clock pulse generator 61 synchronizes the error detector with the data as before. Fip-flop 62 has here a triple function: (1) it remembers the state (positive or negative) of the last MARK in the sequence; (2) it counts the number of SPACES between the MARKS; and (3) it predicts the polarity of the first following MARK (or MARKS). In effect, flip-flop 62 follows the duobinary pattern, and any violation of the duobinary coding rules results in an error indication.

The signal from slicer 60 is negative whenever a lower-zone duobinary pulse has been detected, and positive for inner and upper-zone pulses. Similarly, the output pulse from flip-flop 62 is positive for upper-zone pulses and negative for lower-zone pulses (its state for inner-zone pulses is immaterial here). As long as the outputs of flip-flop 62 and slicer continue to have identical polarities, exclusive-or gate 63 will not produce an output signal; but when they have opposite polarities, an output signal will be provided by gate 63, as described above. Should this pulse occur during a MARK condition, and thus concur with a positive (MARK) pulse to AND-gate 64, AND-gate 64 will furnish an output pulse indicating an error. In the event of such an error indication, flip-flop 62 is immediately restored to its proper polarity, since the error-indicating pulse emerging from AND-gate 64 is passed through OR-gate 66 to the complement input of that flip-flop (62).

Each SPACE is counted by flip-flop 62. For this purpose, the binary waveform is passed through inverter 65*a* into AND-gate 65. The spaces are inverted by inverter 65*a* to become positive pulses, which are then gated through OR-gate 66 to the complement input of flip-flop 62. This flip-flop always commences its SPACE count with a polarity identical to that of the last outer-zone duobinary pulse (upper or lower) representing the last converted MARK. The flip-flop then senses the SPACES to determine whether the number of consecutive SPACES between successive MARKS is even or odd. After the last such SPACE has appeared, a prediction is made by flip-flop 62 as to the expected (correct) polarity of the next outer-zone duobinary pulse. This prediction is compared with the actual location, and if the two locations fail to agree, an error indication is given. An example, illustrating the operation of the error detector of this embodiment during the occurrence of a triple error, is shown in FIG. 9.

Figure 9:
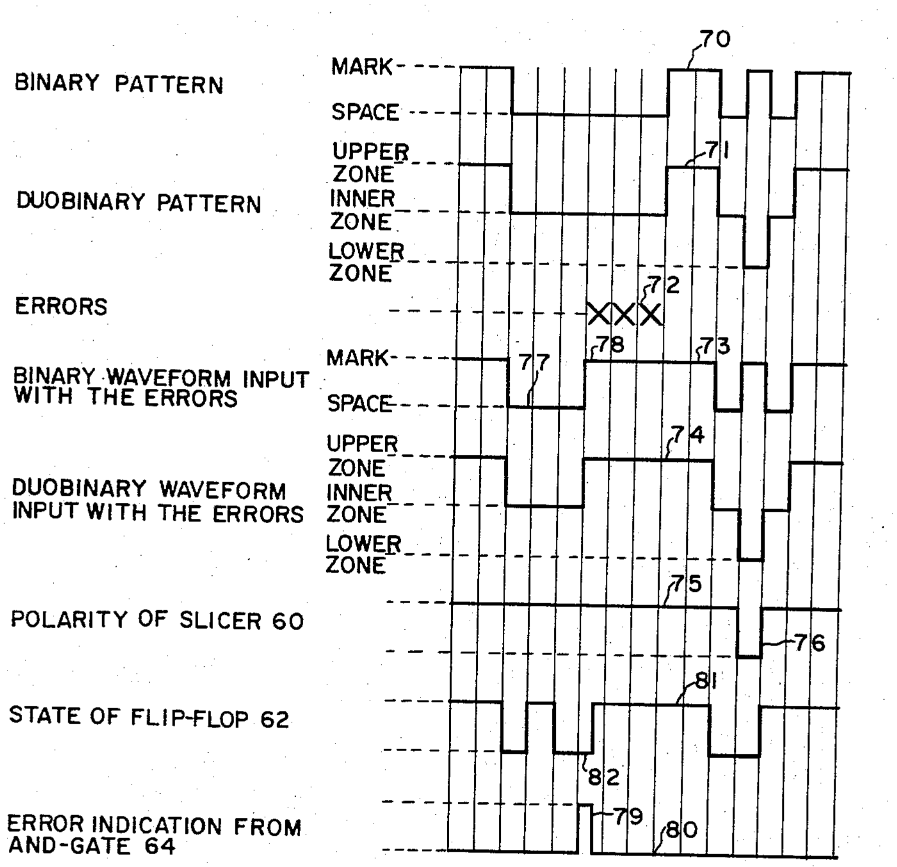
FIG. 9 is a graph showing a duobinary waveform containing an error.

Referring now to FIG. 9, curve 70 shows a typical binary waveform pattern and curve 71 represents the corresponding (correct) duobinary waveform pattern into which the binary curve 70 is to be converted. These patterns are shown correctly. Curve 73 represents the reconverted binary waveform 73 and curve 74 the corresponding duobinary waveform 74; there are three errors appearing in these curves, whose positions are indicated by "X's" 72. Note that because of the errors the binary SPACES have become MARKS, and the corresponding duobinary inner-zone pulses have become upper-zone pulses.

In FIGS. 8 and 9, which will be refered to jointly, the reference numbers 60–69 will indicate FIG. 8 and reference numbers 70–82 will indicate FIG. 9. Slicer 60 provides output waveform 75, which has positive pulses except when the single lower-zone duobinary pulse 76 causes a negative output pulse from slicer 60. Flip-flop 62 changes state with each binary SPACE of waveform 73. In group 77 were three such SPACES (odd number) indicating that the correct duobinary location for the next outer-zone pulse corresponding to binary MARK 78 should be the opposite outer zone—i.e., the lower zone. Thus, during MARK 78, flip-flop 62 is in the negative state, to indicate that the correct duobinary pulse location should be the lower zone. In contradiction to this prediction, however, slicer 60 produces a positive output signal—not the negative output it would have produced had that pulse been in fact located in the lower zone. The resulting difference between the output levels of slicer 60 and flip-flop 62 causes exclusive-or gate 63 to produce an output pulse during this MARK pulse (78). The output pulse passed through AND-gate 64 and emerges as pulse 79 in waveform 80, which is the waveform of AND-gate 64. The output pulse from AND-gate 64 indicates the presence of the error group 72.

Since the output pulse from AND-gate 64 is gated through OR-gate 66 to the complement input of flip-flop 62, it can be seen (from inspection of waveform 81) that the flip-flop changes state during the erroneous MARK pulse 78 in binary waveform 73. As soon as pulse 79 has emerged from AND-gate 64, the negative state of flip-flop 62, shown at point 82, is reversed to positive, restoring the flip-flop to its correct polarity.

The error detection apparatus specifically described above represents only a few of the possible embodiments resulting from the unique inter-correlation between the duobinary waveform bits. Many variations upon the embodiments here illustrated will become readily apparent to the skilled practitioner. Selection of a particular embodiment may depend upon the type of reconverter desired (e.g., the number of slicers) or upon the desired proximity of the error-detector to the receiver. An error detector may also be employed at the transmitter (where the binary waveform is converted to the duobinary form prior to its actual transmission).

Similarly, because specific embodiments of the converter and reconverter have here been selected for detailed illustration, no intention is herewith implied of limiting the invention thereby. Changes in the specific circuitry may be made by those skilled in the art without departing from the spirit and scope of the invention. Therefore the only limitations to be placed upon that scope are those expressed in the claims which follow.

What is claimed is:

1. The method of generating a waveform for data transmission comprising:

(a) receiving a binary waveform having first and second signal levels only, (b) producing a first discrete central signal level from and for the duration of each of the first binary waveform signal levels, and (c) producing a signal in one of two discrete detectable outer signal level zones about the central signal level of step (b) from and for the duration of each of the second binary waveform signal levels with the signal in the outer signal level zones sequenced by repeating the same zone signals following an even number of central signal levels and changing zones for an odd number of central signal levels.

2. Apparatus for converting a binary waveform having a series of pulses of two discrete amplitude levels to a duobinary waveform having a series of pulses having amplitudes in three detectable amplitude zones consisting of one inner zone and two outer zones, the maximum change in amplitude from one pulse to the next adjacent pulse of said duobinary waveform being from one of said three zones to an adjacent zone, which comprises an input means for receiving pulses of said binary waveform, a digital differentiator connected to said input means, and a low-pass filter connected to the output of said digital differentiator to thereby produce a duobinary waveform having components as follows:

(a) a duobinary pulse of amplitude in said inner zone in response to the receipt of a binary pulse of one of said two amplitude levels;

(b) a duobinary pulse of amplitude in the same one of said two outer zones as the preceding outer zone duobinary pulse in said duobinary waveform in response to the receipt of a binary pulse of the other of said two amplitude levels, providing said binary pulse of said other amplitude level follows an even number of successive binary pulses of said one amplitude level; and (c) a duobinary pulse of amplitude in the opposite one of said two outer zones from the last outer zone duobinary zone duobinary pulse of said duobinary waveform in response to the receipt of a binary pulse of said other of said two amplitude levels provided said binary pulse follows an odd number of successive binary pulses of said one of said two amplitude levels, thereby producing a duobinary pulse in a predetermined amplitude zone in response to the receipt of each binary pulse.

3. The apparatus of claim 2 further defined by delay means connected to the output of said digital differentiator with said delay means having a delay interval equal to a single digit of the input binary waveform, and an arithmetic summer having an input connected to the output of said delay means and to the output of said digital differentiator and having the output thereof connected to the input of said filter.

4. Apparatus for converting a duobinary waveform into its corresponding binary waveform, which comprises:

(a) input means for receiving duobinary pulses;

(b) means for detecting when the received duobinary pulses have their amplitudes in either one of the two outer amplitude zones; and (c) signal means connected to said detecting means and producing a first binary signal level for detected duobinary pulses in either of the two outer amplitude zones and the alternate binary signal level in the absence of detected duobinary pulses in said two outer amplitude zones.

5. The apparatus of claim 4 further defined by said detecting means and signal means including two slicers, one adapted to detect duobinary pulses having amplitudes in one of said two outer amplitude zones, and the other adapted to detect duobinary pulses having amplitudes in the other of said two outer amplitude zones, both slicers having output pulses in response to the receipt of such outer zone duobinary pulses, and means for combining the output pulses from said two slicers into a single binary waveform representing the binary waveform corresponding to the input duobinary waveform.

6. The apparatus of claim 5 further defined by said combining means being an arithmetic summer.

7. The apparatus of claim 4, having in addition a retiming means for removing any time jitter from the resultant waveform.

8. Apparatus for converting a duobinary waveform into its corresponding binary waveform, which comprises:

(a) input means for receiving duobinary pulses;

(b) a first slicer for detecting duobinary pulses in one of two outer amplitude zones, and for providing an output pulse of one polarity in response thereto;

(c) a second slicer for detecting duobinary pulses in the other of the two outer amplitude zones, and for providing an output pulse of the opposite polarity in response thereto;

(d) a pulse inverter for inverting the output pulses of one of said slicers; and (e) an arithmetic summer for summing the output pulses from one slicer with the inverted output pulses from the other emergent from said inverter, said summer producing said corresponding binary waveform.

9. The apparatus of claim 8 including in addition a retiming means for removing any time jitter from the resultant binary waveform.

10. Apparatus for detecting errors in a duobinary waveform which comprises:

(a) input means for receiving duobinary pulses;

(b) means for sensing the number of successive inner zone pulses in any group of such successive inner zone pulses to determine if said number is even or odd, the output of said sensing means being a prediction of which of the two outer zones the amplitude of the outer zone pulse immediately following said successive inner zone pulses should lie in;

(c) detecting means for detecting in which of said two outer zones the amplitude of each outer zone pulse actually lies; and (d) means for comparing the outer zone detected by said detecting means with the outer zone predicted by said sensing means, and for indicating an error when the predicted and detected outer zones fail to agree.

11. The apparatus of claim 10 further defined by said sensing means and comprising a single flip-flop having its complement input connected to be complemented upon receipt of each duobinary pulse having its amplitude in said inner zone, and also upon the indication of an error.

12. The apparatus of claim 10, further defined by said sensing means comprising a flip-flop having an output, a set input, a reset input, and a complement input, said set input connected to be pulsed upon receipt of a duobinary pulse having an amplitude in one of the two outer zones, said rest input connected to be pulsed upon receipt of a duobinary pulse having an amplitude in the other of said two outer zones, and said complement input adapted to be pulsed upon receipt of a duobinary pulse having an amplitude in said inner zone, and said memory means comprising a digital single-bit delay having its input connected to said output of said first flip-flop.

13. Apparatus for detecting errors in a duobinary waveform which comprises:

a first input means for receiving duobinary pulses;

a second input means for receiving binary pulses corresponding to said duobinary pulses at said first input means;

a flip-flop having an output, a set input, a reset input, and a complement input;

means connected to said set input of said flip-flop adapted to provide a pulse to said set input upon receipt at said first input means of a duobinary pulse whose amplitude lies within one of two outer amplitude zones;

means connected to said reset input of said flip-flop adapted to provide a pulse to said reset input upon receipt at said first input means of a duobinary pulse whose amplitude lies within the other of said two outer amplitude zones;

means connected to the complement input of said flip-flop adapted to provide a pulse to said complement input upon receipt at said first input means of duobinary pulses whose amplitude lies within the inner amplitude zone;

a single-bit digital delay having an output, and an input connected to the output of said flip-flop;

an exclusive-or gate having two inputs connected to the outputs of said flip-flop and said digital delay, respectively, and providing an output pulse when the polarities indicated by said two inputs are different from one another; and means providing an error output whenever said exclusive-or gate has an output and said second input means indicates the receipt of a binary pulse corresponding to a duobinary pulse whose amplitude lies within one of the outer zones.

14. Apparatus for detecting errors in a duobinary waveform which comprises:

a first input means for receiving a duobinary waveform;

a second input means for receiving a binary waveform corresponding to said duobinary waveform;

a first slicer providing an output pulse whenever the amplitude of a duobinary pulse of said duobinary waveform is in one of the two outer amplitude zones;

a second slicer providing an output pulse whenever the amplitude of a duobinary pulse of said duobinary waveform is in the other of said two outer amplitude zones;

indicating means providing an output pulse whenever the amplitude of a pulse of said duobinary waveform is in the inner amplitude zone;

a flip-flop having an output, a complement input, a set input, and a reset input;

means connecting the output of said first slicer to said set input;

means connecting the output of said second slicer to said reset input;

means connecting the output of said indicating means to said complement input;

a digital single-bit pulse delay having an input and an output;

means connecting the output of said flip-flop with the input of said pulse delay;

an exclusive-or gate having two inputs and an output;

means connecting the outputs of said flip-flop and said delay, respectively, to the two inputs of said exclusive-or gate;

an AND-gate having two inputs and an output; and means connecting one of said inputs of said AND-gate to the output of said exclusive-or gate, and the other of said inputs of said AND-gate to said second input means, said AND-gate providing an output pulse upon the failure of agreement of the inputs to said exclusive-or gate, said failure indicating an error.

15. Apparatus for detecting errors in a duobinary waveform which comprises:

a first input means for receiving a duobinary waveform;

a second input means for receiving a binary waveform corresponding to said duobinary waveform;

a flip-flop having an output, a set input, a reset input, and a complement input;

a slicer with its input coupled to said first input means and its output coupled to one of the set and reset inputs of said flip-flop, said slicer providing an output pulse whenever said duobinary waveform lies in one of the two outer amplitude zones;

a first coincidence means having one input coupled to said second input means and the other input coupled to the output of said slicer, said first coincidence means providing an output pulse whenever said binary waveform has a pulse which is converted to a duobinary pulse of amplitude lying within the other of said two outer amplitude zones, said first coincidence means having its output coupled to the other of the set and reset inputs of said flip-flop;

a means indicating when said binary waveform has a pulse which has been converted to a duobinary pulse of amplitude lying within the inner amplitude zone, said indicating means having an output coupled to the complement input of said flip-flop;

a digital single-bit delay having an output and an input connected to the output of said flip-flop;

an exclusive-or gate having an output, one input coupled to the output of said digital delay, and another input coupled to the output of said flip-flop; and and AND-gate having an output, one input coupled to the output of said exclusive-or gate, and another input coupled to said second input means, said AND-gate producing an output pulse in the event of an error occurring on a binary pulse converted to a duobinary pulse lying in an outer amplitude zone.

16. Apparatus for detecting errors in a duobinary waveform which comprises:

a first input means for receiving a duobinary waveform;

a second input means for receiving a binary waveform corresponding to said duobinary waveform;

a slicer providing an output pulse when the amplitude of the duobinary pulses of said duobinary waveform are in one of the two outer amplitude zones;

a flip-flop having an output and a complement input;

a first indicating means indicating when said binary waveform has a pulse which is converted to a duobinary pulse of amplitude in the inner amplitude zone;

a second indicating means indicating when said binary waveform has a pulse which is converted to a duobinary pulse of amplitude in one of the two outer amplitude zones;

a means connecting said first indicating means to the complement input of said flip-flop;

an exclusive-or gate having two inputs and an output;

a means connecting the output of said flip-flop with one input of said exclusive-or gate;

a means connecting the output of said slicer with the other input of said exclusive-or gate;

a coincidence means connected to provide an output pulse upon the coincidence of an output pulse from said second indicating means and an output pulse from said exclusive-or gate, said output pulse from said coincidence means indicating an error; and means coupling the output of said coincidence means with the complement input of said flip-flop to restore the flip-flop to the proper polarity after the error.

References Cited

UNITED STATES PATENTS

| | | | |
|---|---|---|---|
| 3,162,724 | 12/1964 | Ringlehaan | 178—68 |
| 3,204,029 | 8/1965 | Groff et al. | 178—68 |
| 3,230,310 | 1/1966 | Brogle | 178—68 |
| 3,234,465 | 2/1966 | Lender | 325—42 |
| 3,238,299 | 3/1966 | Lender | 178—68 |

MALCOLM A. MORRISON, *Primary Examiner.*

K. F. MILDE, *Assistant Examiner.*